United States Patent Office 3,074,938
Patented Jan. 22, 1963

3,074,938
2,4,5-TRICHLOROPHENOL CYANINE DYE COMPOUND AND PROCESS FOR THE PREPARATION THEREOF
David B. Capps, Ann Arbor, Mich., assignor to Parke, Davis & Company, Detroit, Mich., a corporation of Michigan
No Drawing. Filed Jan. 29, 1960, Ser. No. 5,340
1 Claim. (Cl. 260—240.65)

This invention relates to a novel 2,4,5-trichlorophenol compound which possesses anthelmintic activity and to processes for the manufacture thereof.

More particularly the present invention relates to the novel 2,4,5-trichlorophenol compound which has the formula

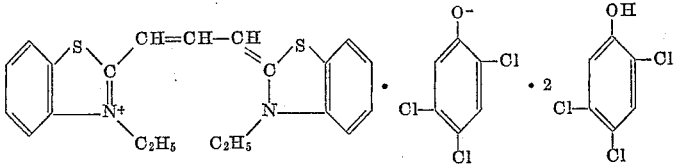

It is known that the 2,4,5-trichlorophenol possesses anthelmintic activity. It is relatively cheap and easily accessible. Its use in human and veterinary medicine is subject, however, to a number of objections which tend to lower its value as a useful anthelmintic agent. In the free state, the compound possesses a highly objectionable taste causing an undesirable burning sensation when introduced into the oral cavity. It is also highly irritating to mucosal tissue and may produce erosion of the oral cavity and gastric disturbances unless administered in dosage forms possessing enteric properties.

The new 2,4,5-trichlorophenol of the present invention is not subject to the above disadvantages. It is non-irritating to mucosal tissue, is essentially tasteless, and can be administered readily in the form of suspensions, tablets, or powders, or as a feed additive. In addition, the novel compound of the invention possesses a spectrum of anthelmintic activity which is markedly broader than, and superior to, that of the known 2,4,5-trichlorophenol.

The novel 2,4,5-trichlorophenol compound of the invention can be conveniently prepared by reacting one molecular equivalent of a soluble 3-ethyl-2-[3-(3-ethyl-2-benzothiazolinylidene) propenyl] benzothiazolium compound having the formula

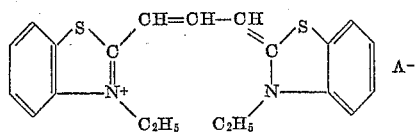

with at least 3 molecular equivalents of 2,4,5-trichlorophenol. In the above formula A⁻ represents the hydroxide ion or an anion of an acid. The term "soluble compound" is used here in a relative sense and means a degree of solubility substantially greater than that exhibited by the novel 2,4,5-trichlorophenol compound of the invention. Some examples are 3-ethyl-2-[3-(3-ethyl-2- benzothiazolinylidene) propenyl] benzothiazolium chloride, bromide, iodide, perchlorate, thiocyanate, ethosulfate, acetate, benzenesulfonate, and p-toluensulfonate. Some of these compounds are known, others can be prepared by reacting the quaternary ammonium hydroxide with an acid. The quaternary ammonium hydroxide can be prepared by reaction of the iodide with silver oxide in the presence of water.

When a 3-ethyl-2-[3-(3-ethyl-2-benzothiazolinylidene) propenyl] benzothiazolium compound other than the hydroxide is employed as the starting material, one molecular equivalent of the 2,4,5-trichlorophenol can be present in the reaction mixture in the form of an alkali metal salt. This alkali metal salt of the 2,4,5-trichlorophenol can be added to the reaction mixture or produced in situ. Suitable solvents for the reaction are those in which the reactants are at least partially soluble, and which are relatively non-reactive toward each of the reactants. Reaction media preferred because of satisfactory solvent properties, unreactivity and inexpensiveness are water and lower molecular weight alkanols. Other satisfactory media can be selected from a wide variety of solvents, particularly those which are neutral and polar. The reaction product may be isolated by direct filtration, or by filtration following concentration of the reaction mixture or dilution with a non-polar solvent or with water.

The product of the invention is useful as an anthelmintic agent. It possesses a high degree of activity when administered orally to higher animals infested with worms of the genera Ascaris, Toxocara, Toxascaris, Trichuris, Syphacia, Aspiculuris, Oxyuris, Nematospiroides and the like. It is best administered in association with an inert diluent or carrier which may be either solid or liquid in nature. Thus the new compound may be utilized in dosage forms such as compressed tablets, capsules, or aqueous suspensions. A particularly valuable method of administering the product in veterinary medicine consists in admixing it with the normal food ration of the animal concerned. Due to the fact that it is practically tasteless, it is taken readily when administered in this form; a distinct advantage over the known 2,4,5-trichlorophenol.

The following examples illustrate the invention.

*Example 1*

A solution of 59 g. (0.30 mole) of 2,4,5-trichlorophenol in 100 ml. of methanol is added to a solution of 32 g. (0.06 mole) of 3-ethyl-2-[3-(3-ethyl-2-benzothiazolinylidene) propenyl] benzothiazolium p-toluenesulfonate in 500 ml. methanol. 10 ml. (0.06 mole) of 6 N aqueous sodium hydroxide is added, followed by 200 ml. of water at 60° C. A red oil separates immediately which crystallizes on cooling. The reaction mixture is allowed to stand overnight, the crystalline solid collected by filtration and washed with 50 ml. of aqueous methanol (1 vol. water: 3 vol. methanol). The product is dissolved in 1100 ml. of hot methanol, 5.6 g. of 2,4,5-trichlorophenol added, followed by 185 ml. of warm water (60° C.) and the mixture allowed to cool. The precipitate which forms on cooling is collected by filtration, washed with aqueous methanol (1:6 by volume), and dried in vacuo at 50° C. The product has the formula

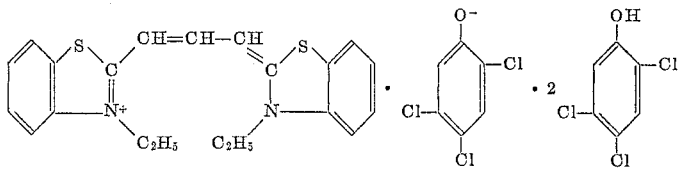

and melts at 135–7° C.

By substituting 26.8 g. of 3-ethyl-2-[3-(3-ethyl-2-benzothiazolinylidene) propenyl] benzothiazolium bromide for the 32 g. of the 3-ethyl-2-[3-(3-ethyl-2-benzothiazolinylidene) propenyl] benzothiazolium p-toluenesulfonate used in the above procedure one obtains the same product.

The 3-ethyl-2-[3-(3-ethyl-2-benzothiazolinylidene) propenyl] benzothiazolium p-toluenesulfonate used as starting material in the above procedure may be prepared in the following manner: A mixture of 300 g. of (2.0 moles) of 2-methylbenzothiazole and 450 g. (2.25 moles) of ethyl p-toluenesulfonate is heated to about 140–50° C. at which temperature an exothermic reaction occurs and external heating is removed. After the temperature stops rising, heating is resumed and the temperature of the reaction mixture maintained in the range between 140–190° C. for a total of one and one-half hours. Upon cooling, the reaction mixture crystallizes. The crystalline mass is triturated with ethyl acetate, filtered, dissolved in 1 liter of hot alcohol and enough warm ethyl acetate added to make a total volume of 6 liters. The mixture is cooled to 10° C., the precipitate collected by filtration, washed with ethyl acetate, and dried in vacuo at 65° C. The methylbenzothiazole-etho-p-toluenesulfonate so prepared melts at 162–4° C.

A mixture of 105 g. (0.3 mole) of methylbenzothiazole-etho-p-toluenesulfonate, 90 g. (0.6 mole) of triethyl orthoformate and 330 ml. of pyridine is refluxed with rapid stirring for one and one-fourth hours and allowed to cool overnight. The precipitate is collected by filtration, washed with water, and recrystallized from a mixture of 700 ml. of methanol and 700 ml. of water to obtain the desired 3-ethyl-2-[3-(3-ethyl-2-benzothiazolinylidine) propenyl] benzothiazolium p-toluenesulfonate which melts at 50° C.; M.P. 268–9° C. after drying in vacuo.

*Example 2*

A hot, filtered solution of 5 g. of 3-ethyl-2-[3-(3-ethyl-2-benzothiazolinylidene) propenyl] benzothiazolium bromide in a mixture of 100 ml. methanol and 5 ml. water is shaken with a suspension of 10 g. of finely-divided, freshly prepared silver oxide (silver hydroxide). The resulting mixture of silver salts is separated by filtration through diatomaceous earth and the filtrate which contains the 3-ethyl-2-[3-(3-ethyl-2-benzothiazolinylidene) propenyl] benzothiazolium hydroxide is added to a hot solution of 10 g. of 2,4,5-trichlorophenol dissolved in 120 ml. of methanol. 30 ml. of water is then added and the reaction mixture allowed to stand overnight. The crystalline solid is collected by filtration, recrystallized from aqueous methanol and dried in vacuo at 50° C. to obtain the desired product which has the formula given in Example 1; M.P. 134–6° C.

If desired, 10 g. of finely-divided, freshly prepared silver carbonate may be substituted for the 10 g. of silver oxide in the foregoing procedure.

What is claimed is:

The 2,4,5-trichlorophenol compound of the formula

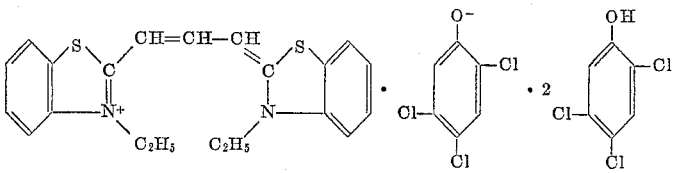

References Cited in the file of this patent

UNITED STATES PATENTS

| | | |
|---|---|---|
| 2,245,249 | Brooker | June 10, 1941 |
| 2,245,250 | Brooker | June 10, 1941 |
| 2,893,914 | McCowen et al. | July 7, 1959 |
| 2,925,417 | Elslager et al. | Feb. 16, 1960 |

FOREIGN PATENTS

| | | |
|---|---|---|
| 533,238 | Great Britain | Feb. 10, 1941 |
| 217,067 | Australia | Sept. 20, 1956 |

OTHER REFERENCES

Chem. Abstracts, vol. 28, col. 4712 (1934).

Lamson et al.: J. of Pharm. and Experimental Therapeutics, vol. 56, pp. 60 to 62 (1936).

Chem. Abstracts, vol. 34, cols. 4069–4070 (1940).

Martin: Am. Journ. Vet. Res., vol. 11, pp. 58 to 69 (1950).

Venkataram: The Chemistry of Synthetic Dyes, vol. II, pages 1157 and 1185–86, Academic Press Inc., New York (1952).

Perez-Santiago: The Amer. Jour. of Tropical Medicine and Hygiene, vol. 2, No. 2, pp. 307 to 310 (1953).

Elsevier: Chemistry of Carbon Compounds, vol. IIIA, page 439, Elsevier Pub. Co., New York (1954).

Swartzwelder et al: Journ. Am. Med. Assoc., vol. 165, pages 2063 to 2067 (December 21, 1957).